No. 679,174.  
P. M. LINCOLN.  
POWER FACTOR METER.  
(Application filed Mar. 27, 1901.)  
Patented July 23, 1901.

(No Model.)

WITNESSES:  
F. L. Ourand  
Albert Popkins

INVENTOR  
Paul M. Lincoln  
BY Sturtevant & Greeley  
ATTORNEYS.

UNITED STATES PATENT OFFICE.

PAUL M. LINCOLN, OF NIAGARA FALLS, NEW YORK.

POWER-FACTOR METER.

SPECIFICATION forming part of Letters Patent No. 679,174, dated July 23, 1901.

Application filed March 27, 1901. Serial No. 53,123. (No model.)

*To all whom it may concern:*

Be it known that I, PAUL M. LINCOLN, a citizen of the United States, residing at Niagara Falls, in the county of Niagara, State of New York, have invented certain new and useful Improvements in Power-Factor Meters, of which the following is a description, reference being had to the accompanying drawings and to the letters and figures of reference marked thereon.

My invention relates to improvements in alternating-current-measuring instruments, and particularly to that class of meters which is intended to measure the phase displacement of two different alternating currents.

Briefly, my phase-meter consists of two systems of coils relatively movable. One system comprises two coils, such that they may be adjusted to a fixed relative position, having their magnetic axes angularly displaced, and so connected as to carry currents from the same source or circuit, but displaced in phase through the medium of some phase-modifying device or devices. The other system consists of a single coil arranged to create a field adapted to react upon the resultant field of the first system of coils and so connected as carry a current supplied from either the same or another source or circuit. If the single coil carries a current whose phase always bears some definite relation to the phase of one current to be compared and the two coils of the other system carry currents of a displaced phase, but which also bear a definite phase relation to the other current under comparison, the movable system will take up a position dependent upon the phase difference of the two currents. The angular departure of the coils from the position assumed when the two currents are in phase will always be exactly equal to the phase-angle difference when one current differs in phase from the other, provided that the two relatively-fixed coils are displaced by an angle of ninety degrees, that they carry currents in quadrature, and that their ampere-turns are equal.

This phase-meter is particularly useful as a power-factor meter to measure the phase difference between the current and the electromotive force in an alternating-current circuit. I have also devised certain improvements in this phase-meter by means of which increased sensitiveness may be had at any predetermined point of the cycle; also, other improvements whereby difficulties in obtaining quadrature in the two relatively-fixed coils may be rendered of no importance.

My invention will be more particularly pointed out in the matters hereinafter described and referred to in the appended description and claims.

Figure 1 represents my improved phase-meter shown applied to an alternating-current system as a power-factor meter. Fig. 2 is a diagram illustrating the electrical and mechanical angle between the two relatively-fixed coils. Figs. 3, 4, and 5 represent the various improvements applied to the two-coil element.

Similar reference characters indicate like parts throughout the drawings.

Referring particularly to Fig. 1, G is a generator of alternating currents supplying energy to the translating devices 7 through the mains 1 and 2.

D is a coil wound upon a core of magnetic material C, in this case shown in series with the main 1. It may be advisable in some cases to omit the magnetic material C.

A and B are fine-wire coils mounted upon an axis within the field created by D and free to turn without the restraining influence of any spring or other check. These two coils are in two different branches of the circuit 4 to 6, shunted across the mains 1 and 2. Any means for obtaining quadrature between the currents in A and B may be used. The means illustrated consists of a non-inductive resistance 5 in series with the coil A and an inductive resistance 3 in series with B. Absolute quadrature cannot, of course, be obtained by this means; but exact quadrature is not necessary to an operative instrument. A pointer F is carried by the coils A and B, and suitably disposed with reference thereto is a scale E, such that the angular position of F may be readily ascertained.

It will be observed that with the connections above described the coils A and B will move to a position where the forces acting upon them are in equilibrium; that when there is no current lag, or, in other words, with unity-power factor, the current in A being substantially in phase with the electromotive force, the coil A will take up a position at right angles to the field of C, there being no torque upon B. With a lag of ninety degrees A would take up a position parallel to the field of C, there being no torque upon A. At intermediate positions equilibrium will be reached, such that the angular movement of the pointer from its zero position shows the precise angle of lag.

It is evident that used as a power-factor meter the instrument measures the phase difference between the current and the electromotive force by measuring the phase difference between the currents in circuits 1 and 4 to 6. In the same way it may be applied to measure phase difference between any two currents whether supplied from the same source or not.

If the phase difference or the electrical angle between A and B differs from ninety degrees, the indication will differ from the normal reading, the amount of difference being nearly equal to the departure from ninety degrees. I have discovered, however, that the effect of making the electrical angle between A and B other than ninety degrees is to afford increased sensitiveness at certain parts of the scale—that is to say, at certain positions the mechanical movement of the coils for a given phase-angle difference is greater than at others. These positions of maximum sensitiveness will be located about forty-five degrees and two hundred and twenty-five degrees on one side or the other of the zero-point, according as a positive or negative electrical angle is chosen—i. e., an angle of lead or an angle of lag, respectively—also depending on whether the electrical angle is greater or less than ninety degrees, the sensitiveness being greater as the departure of the electrical angle from ninety degrees is increased. Changing the mechanical angle alone, so as to cause a departure from ninety degrees, will have same effect in increasing the sensitiveness at points forty-five degrees from the zero-point as changes in the electrical angle will.

It is frequently desirable that the pointer should have a movement strictly proportional to the phase-angle and at the same time impractical or difficult to obtain exact or even approximate quadrature. I have discovered in this connection that an electrical angle of ninety degrees may be departed from without affecting the correct reading of the instrument if the mechanical angle between A and B is made equal to the supplement of the electrical angle. This is shown diagrammatically in Fig. 2.

If $\theta$ represents the electrical angle between the two coils, then the mechanical angle between them should be made equal to $B = 180° - \theta$, and the relative positions of the two coils is represented by A A and B' B'.

In using this instrument as a power-factor meter it is often an advantage to have increased sensitiveness under conditions of unity-power factor, or, in other words, no current lag. This may be attained, I have found, by the simple expedient of making the number of ampere-turns of coil B greater than that of coil A. Fig. 3 shows an element constructed for this purpose, giving increased sensitiveness when the plane of B is parallel or nearly parallel with the field due to C. It is evident that increased sensitiveness may also be obtained at points located ninety degrees from the above positions by making the number of ampere-turns of A greater than that of B. The sensitiveness at these points is increased very nearly in the ratio of the ampere-turns of the larger coil to the smaller.

Figure 1:
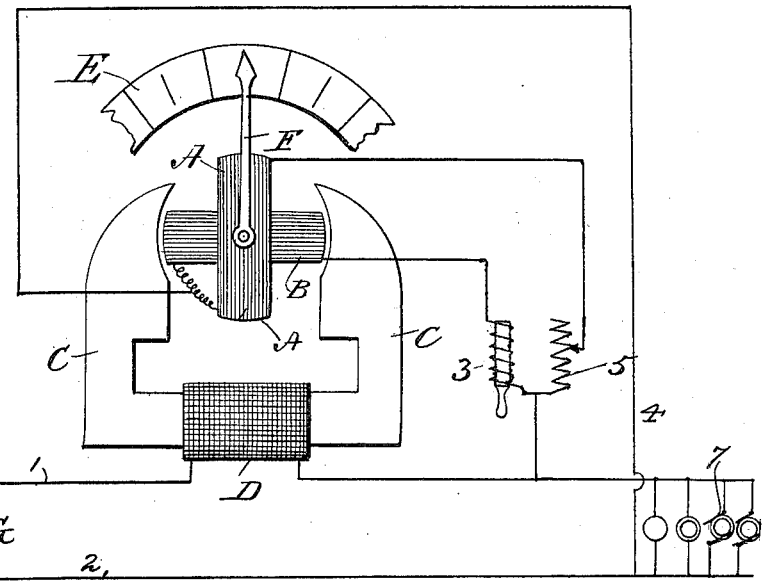
Figure 2:
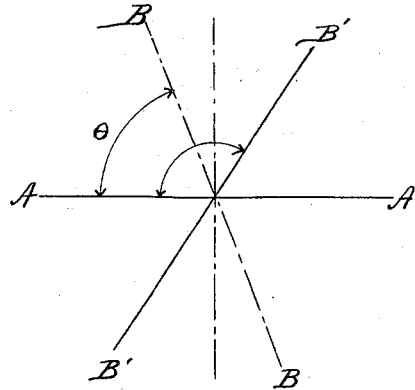
Figure 3:
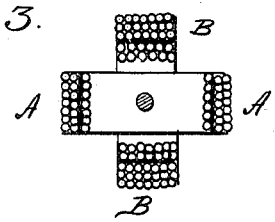
Figure 5:
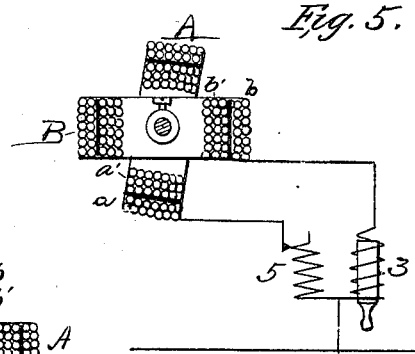
Fig. 5 shows an indicator in which the movable element is wound as in Fig. 4 and having the coils adjustable to any desired angle.
Figure 4:
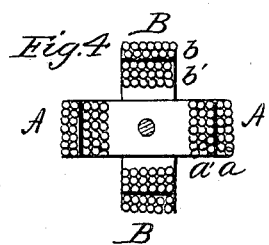
Fig. 4 shows the coils wound in two sections $a\ a'\ b\ b'$. By this means, through a change of connection, one section of either coil may be cut out of circuit in order to increase the sensitiveness of the instrument at or near any one of the four points above indicated, as occasion may require.

It is evident that by combining the several features described—that is to say, by a proper relation of the strengths of the two armature-windings and the electrical and mechanical angle between them or by combining any two of them or using them severally—a maximum movement of the rotatable element relative to the angle of phase difference may be made to take place at any desired point in the cycle.

My invention broadly comprehends any adjustment of the electrical or mechanical constants in this instrument which will alter its sensitiveness under any given conditions.

It is also evident that the specific construction shown may be widely departed from without exceeding the spirit of my invention, that the movable and stationary systems may be interchanged, and that the exciting-current for the two systems of coils may be derived from the circuits in a variety of ways.

Having thus described my invention, what I claim, and desire to secure by Letters Patent, is—

1. In an alternating-current-measuring instrument the combination of two elements relatively movable, and means for indicating thereby phase-angle differences, said indicating means being arranged to have supersensitive points of indication at predetermined positions; substantially as described.

2. In a phase-meter, the combination with two elements relatively movable, of means for exerting a plurality of component reactive effects between the same, varying in relation with changes in phase, whereby the movable element is caused to alter its position with phase-angle changes, such instrument being adjusted to give points of supersensitiveness at predetermined positions of the movable member; substantially as described.

3. In a phase-indicator, the combination of two elements relatively movable, and means for exerting two component reactive effects between the said elements, varying in relation with changes in phase, and displaced by a mechanical angle such as to give points of supersensitiveness at predetermined positions in the indication of the instrument; substantially as described.

4. The combination of two systems of relatively-movable coils, one consisting of two relatively-fixed coils angularly displaced, means for indicating thereby the phase relations of alternating currents, the angular displacement of said fixed coils being such as to give points of maximum sensitiveness at predetermined positions in the indication; substantially as described.

5. In a phase-indicator, the combination of two elements relatively movable, and means for acting upon one of said elements with alternating currents of displaced phase to produce a plurality of component reactive effects between said elements, varying in relation with changes in phase, the phase displacement of the currents being such as to give points of maximum sensitiveness at predetermined points in the indication; substantially as described.

6. In an alternating-current-measuring instrument, the combination of two elements relatively movable, means for acting upon said elements with alternating currents to produce a plurality of component reactive effects between the same, varying in relation with changes in phase, whereby the movable element is caused to alter its position with phase-angle changes, the reactive effects being of unequal maximum value; substantially as described.

7. In an alternating-current-measuring instrument, the combination of two systems of relatively-movable coils, one consisting of two relatively-fixed coils angularly displaced, the other of a single coil, means for feeding to the first-named coils currents of displaced phase, means for exciting the single coil by alternating current, and means for adjusting said instrument to produce points of maximum sensitiveness; substantially as described.

8. In an alternating-current-measuring instrument, two systems of coils relatively movable, one system creating two fields, angularly displaced and of unequal magnitude, the other coil system being adapted to react upon the same to cause movement of the movable member corresponding to phase-angle changes; substantially as described.

9. In a phase-meter, the combination of two elements, means for creating an alternating field in one element, means for creating two fields in the other element electrically and mechanically displaced, said elements being adjusted to produce points of maximum sensitiveness in the instrument; substantially as described.

10. In a phase-meter, the combination of two elements, means for creating an alternating field in one element, means for creating two unequal fields in the other element, electrically and mechanically displaced; substantially as described.

11. In an alternating-current-measuring instrument, the combination of means for indicating phase-angle differences, and means for increasing the sensitiveness of such indication at predetermined points in the cycle; substantially as described.

12. In a phase-meter, the combination of means for creating an alternating field in one element, means for creating two fields in another element, said two fields being mechanically and electrically displaced, and means for adjusting the displacement to give sensitiveness at a predetermined point; substantially as described.

13. In a phase-meter, the combination of an element creating an alternating field, a second element creating two alternating fields, and means for adjusting the relative strengths of said two fields to give increased sensitiveness at predetermined points; substantially as described.

14. In a phase-meter, the combination of an element creating an alternating field, a second element creating two alternating fields, electrically and mechanically displaced, means for adjusting relative strengths of said fields, and means for adjusting the electrical and mechanical displacement; substantially as described.

15. In a power-factor meter, the combination of a field-coil in series with the work-circuit, two coils in shunt thereto, the latter being electrically and mechanically displaced and adjusted to produce points of maximum sensitiveness; substantially as described.

16. In a phase-indicator, the combination of a torque-producing element, a second element producing two torques, and means for effecting a relative adjustment between the two torques of the second element to produce positions of maximum sensitiveness in the indicator; substantially as described.

17. In a phase-indicator, the combination of an element producing a torque, a second element producing two torques, said torques being adjusted to give positions of maximum sensitiveness to the indicator; substantially as described.

In testimony whereof I affix my signature in presence of two witnesses.

PAUL M. LINCOLN.

Witnesses:
PHILIP P. BARTON,
W. K. GIBBONEY.